United States Patent
Zhang et al.

(10) Patent No.: US 9,006,664 B2
(45) Date of Patent: Apr. 14, 2015

(54) ENCODING FOR NUCLEAR MEDICAL IMAGING BLOCK DETECTORS

(75) Inventors: Nan Zhang, Knoxville, TN (US); Niraj K. Doshi, Knoxville, TN (US); Matthias J. Schmand, Lenoir City, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 611 days.

(21) Appl. No.: 13/115,220

(22) Filed: May 25, 2011

(65) Prior Publication Data

US 2012/0212355 A1    Aug. 23, 2012

Related U.S. Application Data

(60) Provisional application No. 61/445,728, filed on Feb. 23, 2011.

(51) Int. Cl.
*G01T 1/20* (2006.01)
(52) U.S. Cl.
CPC .................................. *G01T 1/2018* (2013.01)
(58) Field of Classification Search
CPC ............. G01T 1/20; G01T 1/00; G01T 1/164; G01T 1/1603; G01T 1/1647
USPC .................................................... 250/363.01
See application file for complete search history.

(56) References Cited

U.S. PATENT DOCUMENTS

| | | | | |
|---|---|---|---|---|
| 4,531,058 A * | 7/1985 | Burnham et al. | ........ | 250/363.03 |
| 4,559,597 A * | 12/1985 | Mullani | ........................ | 600/407 |
| 7,692,172 B2 * | 4/2010 | Leben | ........................ | 250/504 R |
| 2008/0017803 A1 * | 1/2008 | Zhang et al. | .................. | 250/366 |
| 2008/0309774 A1 * | 12/2008 | Beng Goh et al. | ......... | 348/218.1 |
| 2010/0025589 A1 * | 2/2010 | Olcott et al. | ............. | 250/363.03 |

OTHER PUBLICATIONS

Zhang et al, (A,B,C,E) and (T,L,E) Multiplexing Readout Concept for PET Block Detectors, Nuclear Science Symposium Conference Record, 2006. IEEE (vol. 5).*

* cited by examiner

*Primary Examiner* — Marcus Taningco
(74) *Attorney, Agent, or Firm* — Peter Kendall (57) ABSTRACT

Signals generated by radiation sensors can be encoded to reduce the number of cables needed to transport information from a nuclear imaging apparatus to a processor for reconstruction. For example, signals from 16 radiation sensors can be encoded into three signals: T (top), L (left), and E (energy). This method of encoding signals can be capable of substantially reducing the number of signals, thereby reducing costs. In addition, reducing the number of signals could improve system timing performance by eliminating cable time-skew and facilitate the filter design by downgrading the circuit accuracy requirements such as group-delay error and filter signal skews.

20 Claims, 9 Drawing Sheets

ENCODING FOR NUCLEAR MEDICAL IMAGING BLOCK DETECTORS

CROSS-REFERENCE TO RELATED APPLICATIONS

This is a non-provisional patent application of pending U.S. provisional patent application Ser. No. 61/445,728, filed Feb. 23, 2011, by Nan Zhang and Niraj Doshi, titled "T(top), L(left), E(energy) Multiplexing Readout Concept for PET Block Detectors", the entirety of which application is incorporated by reference herein.

TECHNICAL FIELD

The present invention concerns signal acquisition in nuclear medical imaging such as Positron Emission Tomography (PET) or Single Photo Emission Computerized Tomography (SPECT) scanners.

BACKGROUND

Figure 1:
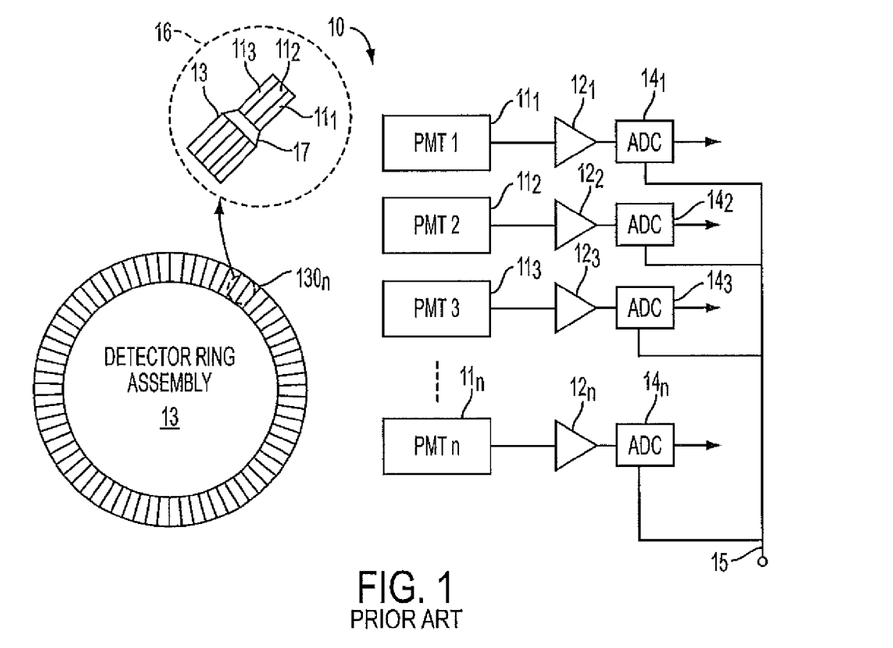
FIG. 1 illustrates a conventional detector ring assembly with associated detector circuitry of a conventional PET scanner.

In the field of nuclear medical imaging technology, which includes PET imaging detector 10, as illustrated in FIG. 1, an array of radiation sensors, such as plurality of scintillators 13 and associated photosensors 11$_n$, such as photomultiplier tubes (PMTs), avalanche photodiodes (APDs), or silicon photomultipliers (SiPMs) are usually arranged in a circle of a detector ring 13. Such a detector ring 13 surrounds a subject to be scanned. To conduct a so-called PET scan, a short-lived radioisotope, which decays by emitting a positron, is injected usually into the blood circulation of a living subject. After the metabolically active molecule becomes concentrated in tissues of interest, the research subject or patient is placed in the imaging scanner. The most commonly-used metabolically active molecule for this purpose is fluorodeoxyglucose (FDG), a sugar, which has a half life of 110 minutes. Note that other radiation sensors, such as solid state detectors could be used in the place of scintillators and photosensors.

As the radioisotope undergoes positron emission decay, it emits a positron, the antimatter counterpart of an electron. After traveling up to a few millimeters, the positron encounters and annihilates with an electron, producing a pair of gamma photons moving in almost opposite directions. These are detected when they reach one of a plurality of scintillation crystals in the scanning device, creating a burst of light detected by an array of photosensors. These bursts of light from a scintillator, such as Lutetium Orthosilicate (LSO) and Bismuth Germanate (BGO), have an intrinsic shape with a fast rising edge followed by a slow falling edge. The signals can be estimated as a function of:

$$V_o(t) \approx A_1 \cdot m_0 \cdot \left( \frac{1}{\tau_1} \cdot e^{-t/\tau_1} - \frac{1}{\tau_0} \cdot e^{-t/\tau_0} \right) \quad (1)$$

where $\tau_0$ is the characteristic scintillator decay time constant; and $\tau_1$ is mainly determined by the characteristics of the photosensor (such as PMT, APD, or SiPM), the open-loop gain of the first amplifier in the front-end electronics, and the input capacitance. When $\tau_0 \gg \tau_1$ (which are the cases for LSO and BGO crystals), $\tau_1$ dominates the rising edge of the pulse, and $\tau_0$ dominates the falling edge.

The Laplace transfer-function of Eq. 1 is:

$$H(s) = \frac{A_1}{\tau_1} \cdot \frac{s}{\left(s + \frac{1}{\tau_0}\right) \cdot \left(s + \frac{1}{\tau_1}\right)} \quad (2)$$

As can be seen in Eq. 2, the falling edge of the scintillation signal is a first-order exponential decay function, so the shape of the signal is always unipolar—it is either positive or negative depending on the polarity chosen for the sensor analog electronics.

Generally a plurality of photosensors 11 can be arranged in a matrix and assigned to detect the light of a single scintillator as shown in the enlarged section 16 in FIG. 1. The scintillator detector 13 can comprise a single scintillation crystal or can be, as shown, a matrix of scintillator crystals that is coupled to the photosensors 11$_1$ ... 11$_n$ via a light guide 17. To be able to increase the resolution of the system without the high costs of 1:1 coupling, the number of photosensors 11 per block is generally significantly lower than the number of scintillation crystals 13. For example, a block detector may have a plurality of photosensors 11 with, for example, 4, 9 or 16 photosensors 11 arranged in a 2×2, 3×3, or 4×4 matrix behind an array of scintillation crystals 13. Other arrangements with more or fewer photosensors 11 are possible. Thus, scintillation event localization can be determined or interpolated by such a scintillation block detector by processing the associated photosensor signals. This can be done by analog filtering, integration, and multiplication of weighted combinations of the photosensor signals or by using digital algorithms that use discrete time sample points of signals obtained directly from the photosensors 11. The PET technique depends on scintillation event detection of the pair of gamma photons.

FIG. 1 illustrates a block diagram of the typical architecture of detectors and associated analog-to-digital-converters in a conventional system. Each matrix of photosensors 11 produces a plurality of signals that can be processed to generate an image from a plurality of scintillation events that are detected by a photosensor 11. To determine the location of a detected annihilation, the system needs to accurately measure the timing and energy of both detected photons. Consequently a high amount of data has to be produced by the respective measurement circuits.

For example, as shown on the right side of FIG. 1, each scintillator has an associated matrix of detectors, such as photosensors 11$_1$ ... 11$_n$, in this example are PMTs for illustration. Each signal of each PMT 11$_1$ ... 11$_n$ is first amplified by, for example, associated preamplifiers/buffers 12$_1$ ... 12$_n$. The output signal of preamplifier/buffers 12$_1$ ... 12$_n$ can then be converted concurrently into discrete-time digital signals by associated analog-to-digital converters (ADC) 14$_1$ ... 14$_n$. A sampling clock for each ADC be can provided at terminal 15. In this example, this digital processing architecture uses n independent ADC signals with peripheral circuitry to concurrently sample each of n photosensor signals per block. This can increase the costs of a detector unit.

Figure 2:
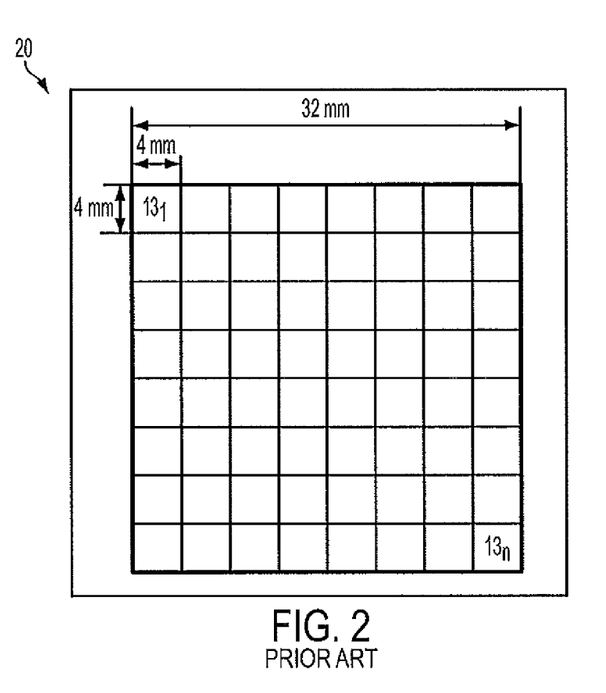
FIG. 2 illustrates an 8×8 array of scintillation crystals.
Figure 3:
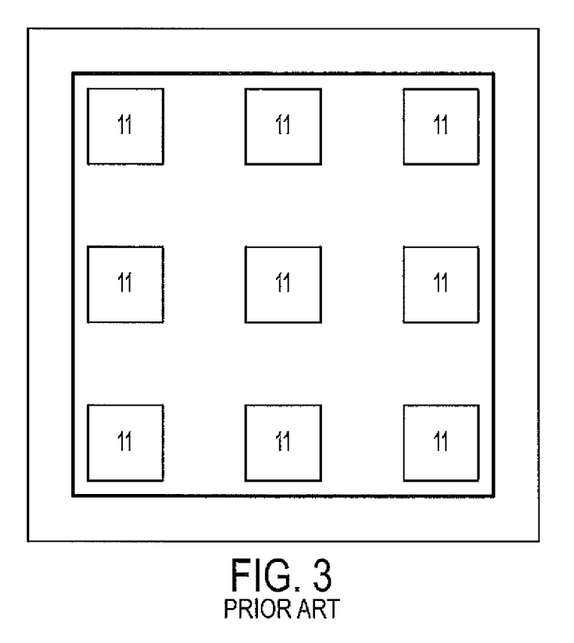
FIG. 3 illustrates a 3×3 array of photosensors.
Figure 4:
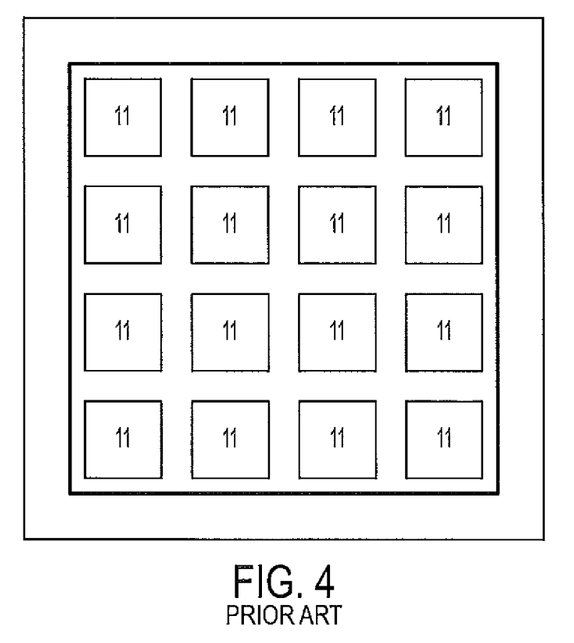
FIG. 4 illustrates a 4×4 array of photosensors.

FIG. 2 illustrates a detector scintillation block comprising an 8×8 array of scintillation crystals 13$_1$-13$_n$; for example, each crystal can be 4 mm×4 mm×20 mm. Photosensors 11 can be included behind the scintillation crystals to detect light emitted due to scintillation events. Exemplary photosensor arrangements of photosensors are illustrated in FIGS. 3 and 4. FIG. 3 illustrates photosensors 11 in a 3×3 array and FIG. 4 illustrates photosensors 11 in a 4×4 array. Either of these arrangements, and others, could be used to detect light emitted from the 8×8 array of scintillation crystals illustrated in FIG. 2.

SUMMARY

Typically there is a one-to-one correspondence between a radiation sensor and a signal path; thus, there is a signal trace (wire or cable) associated with each radiation sensor. Embodiments of the present invention can encode signals from radiation sensors to reduce the number of signal trace used. For example, embodiments of the present disclosure may reduce the signals from 16 (4 signals/block×4 blocks) to 3 (3 signals) combined signals. This encoding topology described can be done using either analog or digital signals.

It can be valuable to reduce the number of signals. For example, in a combination PET system such as MR/PET, the PET electronics cannot be close to the MR scanner. Relatively long signal transmission cables might be used to connect the PET detectors and other processing electronics. Cable shielding and grounding potential could become challenges due to size and cost. In addition, long cables can result in timing skew that can considerably degrade detector timing results. For example, in an MR/PET system, the analog signal lines could be over 10 meters long. With standard CAT 5e cables, the timing skew in the cable can be over 3 ns.

By encoding the signals to reduce the number of signals, the number of cables used can be reduced by a ratio of, as in the above example, 16:3, thereby using fewer signals than the number of radiation sensors. Encoding signals from the radiation sensors can eliminate timing skew. This is down by transmitting the signal used for timing pickup in just 1 pair, rather than 16 pairs. This would significantly increase accuracy, simplify the cable handling, save space and reduce costs for multimodal or dedicated PET or SPECT systems would also benefit.

One embodiment of the present disclosure includes a nuclear imaging apparatus that includes an array of radiation sensors. The nuclear imaging apparatus further includes a first sub-array of the array of radiation sensors associated with a first location, e.g., the top or bottom rows. The nuclear imaging apparatus also includes a second sub-array of the array of radiation sensors associated with a second location, e.g., the left or right columns, thereby forming a diagonal relationship between the first and second sub-arrays because they are diagonal relative to one another. The nuclear imaging apparatus can further include a front-end encoder having a plurality of inputs for signals from the array of radiation sensors and a plurality of outputs encoding signals from the first sub-array, second sub-array, and the array of radiation sensors.

A second embodiment of the present disclosure includes a method of reducing the number of signals from a radiation sensor array that includes detecting a scintillation event at the radiation sensor array. The method can also include encoding the scintillation event into three signals: a first signal representing either a top or a bottom row of the radiation sensor array; a second signal representing either a left or a right column; and a third signal representing a total amount of energy received from the radiation sensor array.

A third embodiment of the present disclosure includes a method of extracting timing and location information, i.e., the location of a scintillation crystal that emitted light, from signals received from a nuclear imaging apparatus that includes a step of receiving, at a processor, signals from a block encoder that encodes signals from a plurality of sub-arrays of radiation sensors. The signals can include sub-array quadrant information, location information, and timing information. The method can also include the step of processing, in the processor, the signals to decode the sub-array quadrant information, location information, and timing information.

Embodiments of the present disclosure can result in substantial cost and space savings, and efficiency. These benefits of the exemplary T/L/E scheme can include improving system timing performance by eliminating cable time-skew and facilitating filter design by downgrading circuit accuracy requirements such as the group-delay error and filter signal skews among the A, B, C, and D signals in conventional PET block detectors. This approach can improve PET or SPECT timing performance in a nuclear imaging apparatuses such as MR/PET, PET/CT, PET/SPECT, dedicated PET, and dedicated SPECT systems. The T/L/E encoding method can simplify PET detector readout by (1) reducing signal processing signals in the main electronics; (2) reduce the signal matching traces from 16 to one: the E signal only; (3) reduce the signal bandwidth requirement for the T and L signals; (4) enhance detector signal-integrity and electromagnetic compatibility.

DETAILED DESCRIPTION

Embodiments of the present invention encode signals from radiation sensors in a plurality of ways. In some embodiments, signals are summed or subtracted to aggregate them into encoded signals. In one example using a 2×2 array of radiation sensors, e.g., photosensors, as illustrated in sub-array 50 of FIG. 5, four signals generated by photosensors A, B, C and D can be multiplexed into three signals labeled Top, Left and Energy (T, L and E, respectively). T being signals from the top two photosensors (A and B); L being the signals from the left two photosensors (A and C); and E being a sum of signals from all four sensors. Instead of reading out each of A, B, C, D from a block detector to a processor for reconstruction, T/L/E can be applied to encode these signals and convey the same information in fewer signals.

Figure 5:
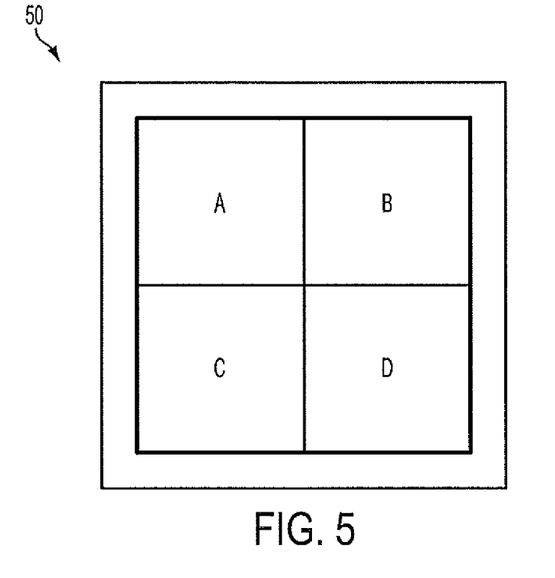
FIG. 5 illustrates a pseudo 2×2 array, wherein each cell comprises a 4×4 array of scintillation crystals.

The location of a particular scintillation event can be determined using Anger-Logic algorithm (Eqs. 3). Eqs. 4 illustrate encodings for Top (T), Left (L), and total energy (E) of signals received from 2×2 sub-array 50. E can be used to determine timing information using, for example, a constant fraction discriminator (CFD) or a related threshold leading-edge trigger. Eq. 5 illustrates a substitution of T/L/E into Eqs. 3 for further simplification, which yields location information, e.g., which photosensors originated the signal.

$$X = \frac{A+C}{A+B+C+D}, \quad Y = \frac{A+B}{A+B+C+D} \quad (3)$$

$$E = A+B+C+D, \quad L = A+C, \quad T = A+B \quad (4)$$

$$X = \frac{L}{E}, \quad Y = \frac{T}{E} \quad (5)$$

Other combinations of sensors besides the top and left sensors can be used: for example, the top and right, bottom and left, or bottom and right sensors. What is important is that a diagonal is formed between the first signals associated with a first location, e.g., top or bottom, and second signals associated with a second location, e.g., left or right, while the third signal is a summation of all signals. This is important because the diagonal relationship can be used to extrapolate where a signal originated, with total energy E as a quantifier. T, L, and E can be used to determine scintillation event location; while E alone can be used to determine energy and timing. Scintillation event location can be extrapolated from T/L/E using, for example, weighting, such as center of mass weighting, center of gravity, Anger Logic, maximum likelihood, or another suitable statistical method. In another embodiment, scintillation event location information can be extrapolated by inputting a received signal into a lookup table (LUT). The LUT can be generated based on location information obtained prior to execution of a scan. Specific scintillators can be targeted with gamma radiation, and the values of X and Y calculated for that scintillation crystal event can be stored for later comparison during a scan. There can be a one-to-one or many-to-one correspondence between the X and Y values of Eq. 5 and scintillator crystal location. In other words, many crystals may map to one LUT value, or there may be a one-to-one correlation.

If two events occur substantially simultaneously, i.e., collision or pileup events, a digital-signal-processing (DSP) post-processing method can be used to process those events. This can be down in the digital domain, such as in a DSP hardware or in a Field-Programmable Gate Array (FPGA).

Figure 6:
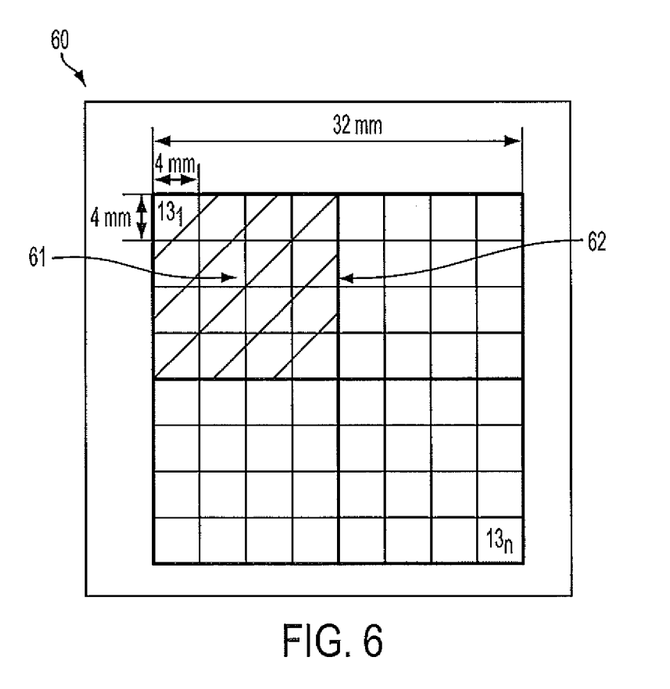
FIG. 6 illustrates and 8×8 array of scintillation crystals, such as the array of FIG. 2, that is separated into 4×4 sub-arrays.

The sub-array 50 of FIG. 5 can be associated with, for example a 4×4 sub-array 61 of scintillation crystals of the 8×8 array 60, as illustrated in FIG. 6. Thus, four sub-arrays 50 in each quadrant could be used to detect light from each sub-array of FIG. 6. An example of a repetition of sub-array 50 over all sub-array quadrants of 8×8 array 20 is illustrated in FIG. 7.

FIG. 6 illustrates scintillator block 60 comprising an 8×8 the photosensors 11 of FIG. 2 divided into four sub-arrays. Crystal light is not shared between sub-arrays of array 20, light from one sub-array quadrant, e.g., 61, is shielded from entering other sub-array quadrants by shielding material 62. Note that all of the light of the 8×8=64 crystals is shared in FIG. 2; but the light is only shared by 4×4=16 crystals in FIG. 6. Blocks can be isolated from each other to improve detector timing resolution.

Figure 7:
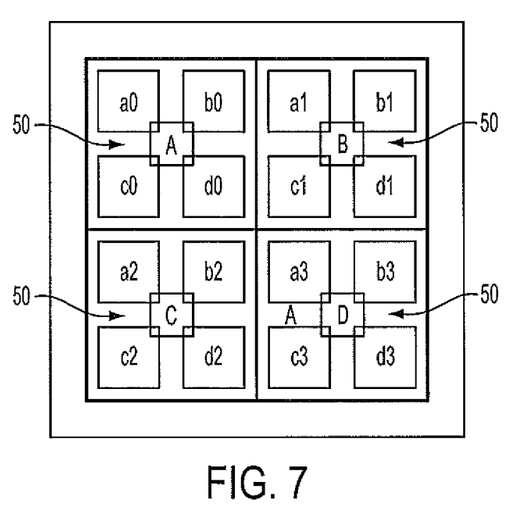
FIG. 7 illustrates a layout of photosensors (a0, b0, c0, d0), (a1, b1, c1, d1), (a2, b2, c2, d2), and (a3, b3, c3, d3), and dedicated analog front-end custom ICs (A, B, C, D), that can be used to sense light emitted by the array of scintillation crystals illustrated in FIG. 6.

FIG. 7 illustrates how four sub-arrays 50 can be arranged to capture light from corresponding sub-array quadrant of photosensors, e.g., 61. 4 copies of sub-array 50 can be arranged in a 2×2 pattern to detect light from respective sub-arrays of scintillation crystals, such as sub-array quadrant 61. Four sub-arrays 50 can be used to cover the entirety of scintillator block 60 can comprise photosensors in a 4×4 array; but each 2×2 photosensor sub-array 50 reads a 4×4 crystal block.

Figure 8:
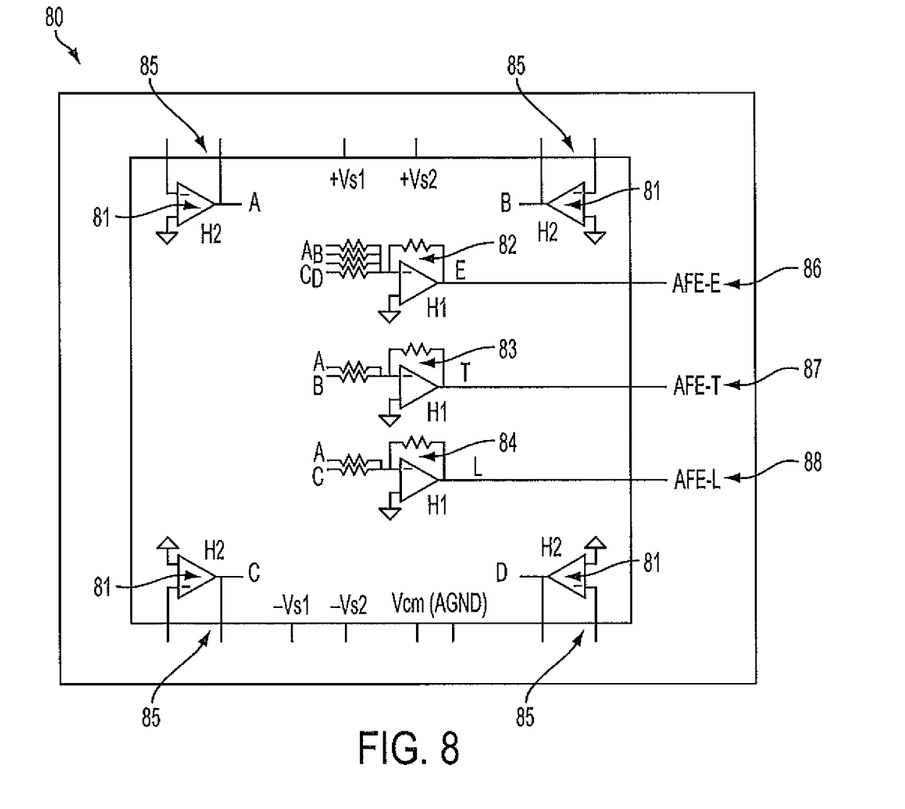
FIG. 8 illustrates an exemplary analog front-end (AFE) circuit for encoding the signals generated by the one sub-array quadrant of the photosensors of FIG. 7.

FIG. 8 illustrates a block diagram of an exemplary analog front-end encoder (AFE) 80 that can perform the encoding of T/L/E discussed above. The AFE comprises a plurality of inputs 85 coupled to decompensated voltage-feedback-amplifiers (decomp' VFAs) 81 in a current-to-voltage transimpedance configuration, and current-feedback-amplifiers (CFA) 82-84 in a summing configuration. Amplifier 83 is configured to sum voltages of A and B, i.e., T, and amplifier 84 is configured to sum the voltages of A and C, i.e., L; these summations correspond to Eqs. 3. Amplifier 82 is configured to sum voltages of A-D, which results in E corresponding to Eq. 4. The E, T and L signals can be output via outputs 86-88, respectively. In this manner, scintillation event location and timing information can be extrapolated as discussed above in more detail. In alternative embodiments, the analog front-end encoder could be digital by performing these summing operations digitally using signals that are converted using an ADC.

Similar to Eqs. 3-5, T/L/E can be calculated for each 2×2 block of FIG. 7 using equations 6-17 below:

$$E_A = a_0 + b_0 + c_0 + d_0 \quad (6)$$

$$T_A = a_0 + b_0 \quad (7)$$

$$L_A = a_0 + c_0 \quad (8)$$

$$E_B = a_1 + b_1 + c_1 + d_1 \quad (9)$$

$$T_B = a_1 + b_1 \quad (10)$$

$$L_B = a_1 + c_1 \quad (11)$$

$$E_C = a_2 + b_2 + c_2 + d_2 \quad (12)$$

$$T_C = a_2 + b_2 \quad (13)$$

$$L_C = a_2 + c_2 \quad (14)$$

$$E_D = a_3 + b_3 + c_3 + d_3 \quad (15)$$

$$T_D = a_3 + b_3 \quad (16)$$

$$L_D = a_3 + c_3 \quad (17)$$

Figure 9:
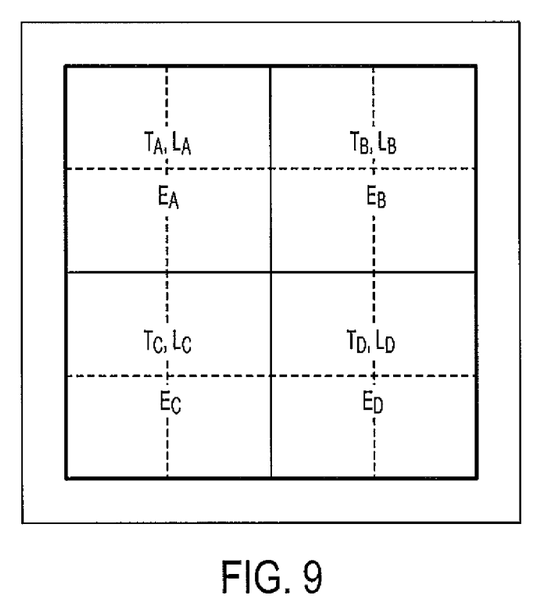
FIG. 9 illustrates example encodings for signals generated by the photosensors of FIG. 7 in accordance with an embodiment of the present disclosure.

Thus, the 16 signals that would typically be would typically be used to extrapolate the location of a particular scintillation event, using signals from sub-arrays 50 in FIG. 7, can be reduced to 12 using the equations above. FIG. 9 illustrates how each of the 12 signals $T_{A-D}$, $L_{A-D}$ and $E_{A-D}$ correspond to each of the sub-arrays 50 FIG. 7.

Figure 10:
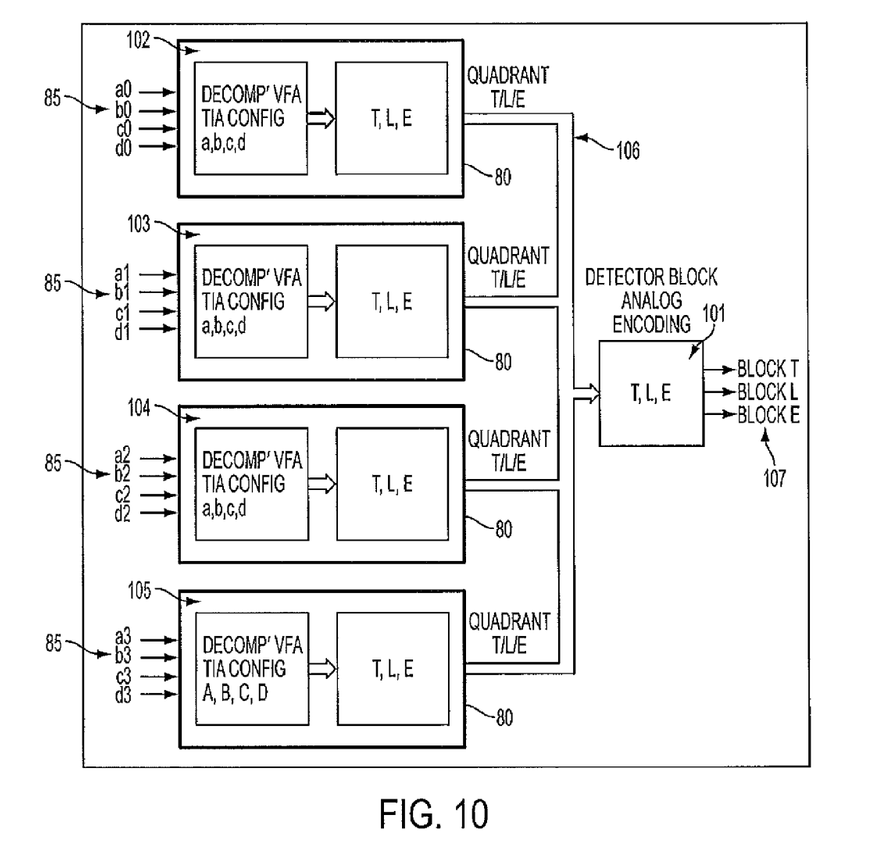
FIG. 10 illustrates a block diagram for encoding the signals from the photosensors of all sub-array quadrants of FIG. 7.

FIG. 10 illustrates a detector block 60 having four copies of AFE 80, one for each sub-array quadrant of detector block 60, these AFEs are labeled 102-105 for sub-array quadrants A, B, C, and D, respectively. The T/L/E output of the AFEs 102-105 can be coupled to the inputs block encoder 101.

AFEs 102-105 output 12 signals (3 (T/L/E) signals for each sub-array quadrant) that are multiplexed onto bus 106. These signals can be further encoded by block encoder 101 to reduce the signal pairs transmitted from the AFEs 102-105. The polarity of the T and L signals can be used to encode sub-array quadrant information, e.g., which quadrant of an array of photosensors that originated a signal. This can be done because pulses generated by the scintillation crystal, and then the photosensor, are unipolar, as shown in equations 1-2. If we separate photosensors arrays into sub-array quadrants, as illustrated in FIG. 5 (A-D), then we need four polarity combinations, which can be accomplished using two signals, e.g., a pseudo-differential pair, because the pair can represent 2 bits, i.e., $2^2$ possible values for four sub-array quadrants. By taking advantage of an analog differential signal processing topology, polarity changes can be accomplished by, for example, swapping the differential output between $V_{OUT}^+$ and $V_{OUT}^-$. The positive and negative values of the outputs can be used to differentiate sub-array quadrants, while the signals' absolute values can be used to determine timing information and location information within the sub-array corresponding to the identified sub-array quadrant. With this block encoding, we can reduce the signal paths from the original 16 signals, one for each photosensor of FIG. 9, to 3 combined signals (T, L, and E, with the sub-array quadrant identified using polarity information). The block output T/L/E pairs 107 from block encoder 101 can be configured as either pseudo-differential or true-differential transmission lines.

Figure 11:
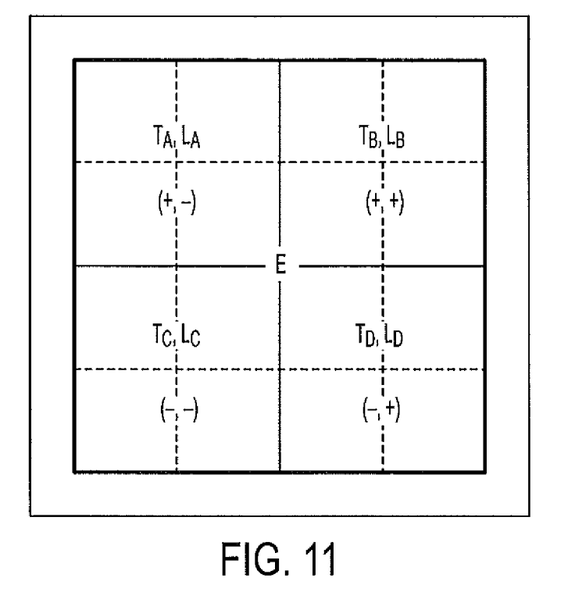
FIG. 11 illustrates an example for encoding signals generated by the photosensors of FIG. 7 in accordance with a second embodiment of the present disclosure.

FIG. 11 illustrates an example of how polarity can be used to represent sub-array quadrants. The assignments of polarity to sub-array quadrant are arbitrary and assigned only to establish a convention; the assignments can be switched without a problem. Equations 18-23 illustrate encoding T/L/E from 12 signals to 3 pseudo-differential pairs in accordance with the assignments of FIG. 11:

$$T_{BLK}^+ = T_A + T_B \quad (18)$$

$$T_{BLK}^- = T_C + T_D \quad (19)$$

$$L_{BLK}^+ = T_B + T_D \quad (20)$$

$$L_{BLK}^- = T_A + T_C \quad (21)$$

$$E_{BLK}^+ = E_A + E_B + E_C + E_D \quad (22)$$

$$E_{BLK}^- = GND \quad (23)$$

Furthermore, the pseudo-differential values defined above can be used to determine location and timing information using the following modifications to Eqs. 3-4:

$$X = (|T^+ - T^-|)/(|E^+ - E^-|) \quad (24)$$

$$Y = (|L^+ - L^-|)/(|E^+ - E^-|) \quad (25)$$

$$E = E^+ \quad (26)$$

Since the T and L signals are used to decode crystal elements, they do not contribute to energy and timing calculations. So the signal to noise ratios (SNR) in the T/L signals are less problematic than in the E signals. Note that the SNR of the E signals can be degraded by about 50% using the configuration illustrated in FIG. 11. This SNR trade-off should be carefully evaluated if a high-degree compression method is implemented.

Without sacrificing any SNR for block energy and timing, we may implement $T(+/-)$, $L(+/-)$, $E_A/E_B/E_C/E_D$ configuration. In this case, the transmission lines are 6 differential pairs.

We may interpret other solutions to compromise SNR with signal-pairs, such as $T(+/-)$, $L(+/-)$, $E_{AB}/E_{CD}$). In this case, we have SNR degradation of about 30%, and four signal pairs.

Figure 12:
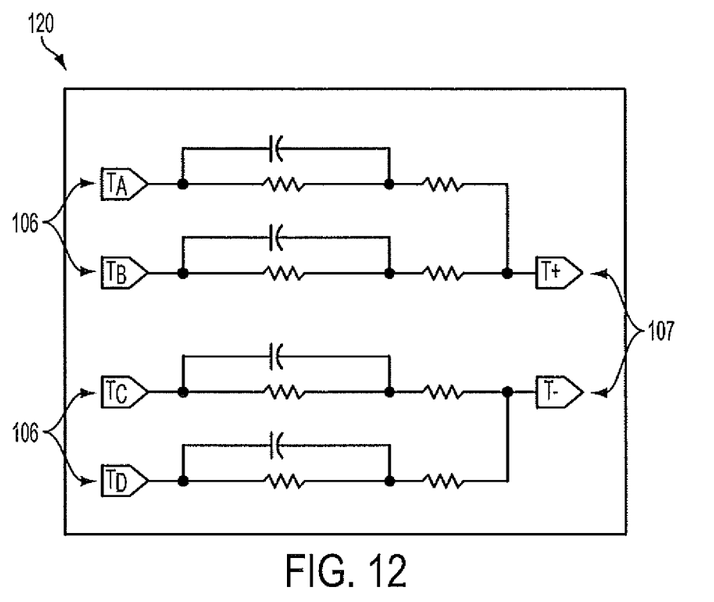
FIG. 12 illustrates a circuit for signal encoding the Top signals (T) by current summing/subtracting.
Figure 13:
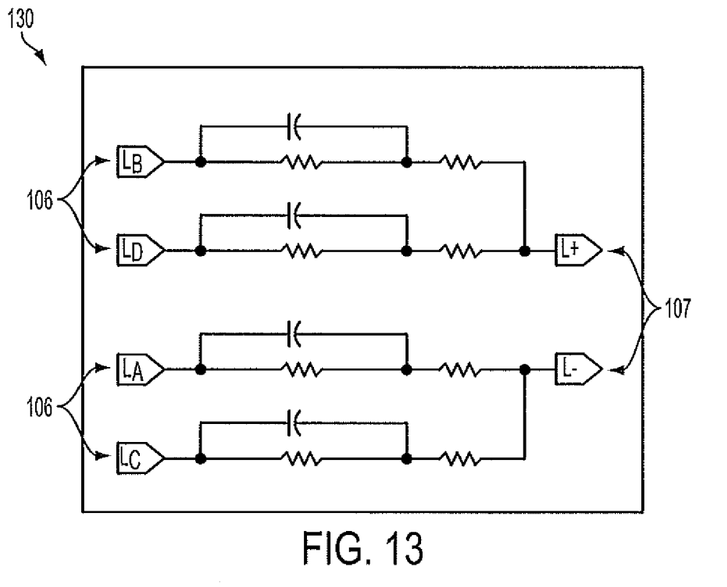
FIG. 13 illustrates a circuit for signal encoding the Left signals (L) by current summing/subtracting.
Figure 14:
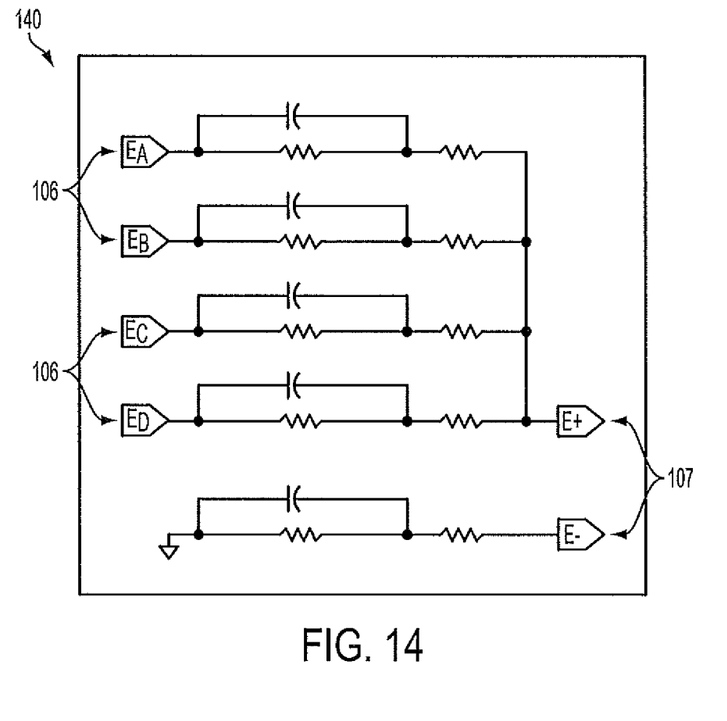
FIG. 14 illustrates a circuit for signal encoding the Energy signals (E) by current summing/subtracting.

The block encoder 101 can comprise RC networks 120, 130, and 140, for T, L, and E, respectively illustrated in FIGS. 12-14. These RC networks can be located near the AFEs. The circuits can comprise a pole/zero pulse-shaping network typically used for BGO scintillators, or LSO scintillator with APD photosensor readout, and perform current encoding (current summing/subtracting). These circuits can be simplified when, for example, LSO scintillators with PMT or SiPM photosensors are employed because pole/zero pulse-shaping networks would not be needed.

Note that, in at least one embodiment, the T/L/E encoding of AFE 80 can use voltage signal encoding (voltage summing/subtracting); while the block encoder 101 of FIG. 10 can use current signal encoding (current summing/subtracting). This is illustrated in FIG. 12 (T signal), FIG. 13 (L signal), and FIG. 14 (E signal). In other embodiments all summing and subtracting can be done using any combination of voltage and current summing and subtracting, or digital summing and subtracting could be used too.

Figure 15:
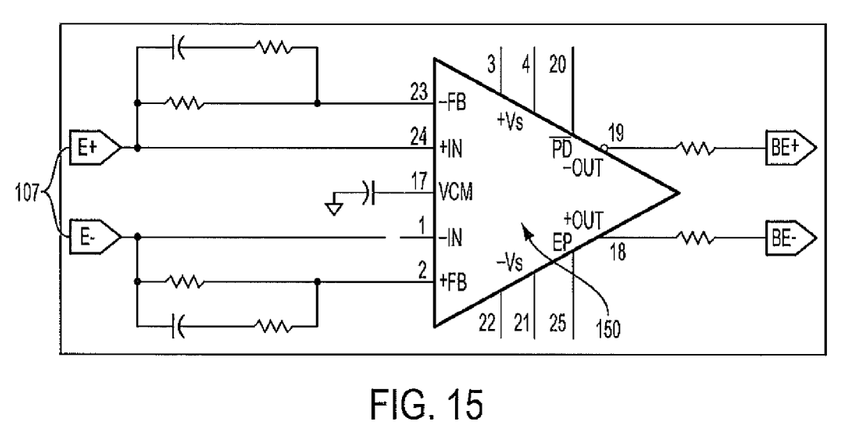
FIG. 15 illustrates a differential driver to set up the voltage potential for the $E^+$ and $E^-$ nodes.

FIG. 15 illustrates an exemplary differential operational amplifier 150 that can complete the pole/zero pulse-shaping network of, for example, current summing RC circuitry 140 for E in FIG. 14. Differential operational amplifier 150 can also set up proper voltage potential for $E^+$ and $E^-$ nodes. Operational amplifiers in similar configurations can also be used for the T and L signals.

The T/L/E outputs can then be decoded using one or more of the algorithms discussed above to determine location and timing information, which, in turn, can be used in any number of reconstruction algorithms as is known in the art for reconstructing images of the region of interest. The reconstruction can be accomplished using a plurality of sets of signals from a plurality of block encoders 101. The algorithms for determining location and timing information can be performed using a computer having a processor, memory and non-volatile storage.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. For example, while the disclosure focuses on PET applications, a person of ordinary skill in the art could, after reviewing this disclosure, apply the same principles to SPECT systems because the two modalities operate in a similar manner. In addition, other radiation sensors, such as solid state sensors, could be substituted for photosensors. The depicted and described embodiments of this disclosure are examples only, and are not exhaustive of the scope of the disclosure.

We claim:

1. A nuclear imaging apparatus comprising:
    an array of radiation sensors, each sensor providing a sensor signal in response to a scintillation event incident on said array; and
    a front-end encoder configured to receive, for each incident scintillation event, the sensor signals from the array of radiation sensors and to convert the sensor signals into a plurality of encoded signals for calculation of a spatial location of the scintillation event on said array, wherein said plurality of encoded signals is smaller in number than the sensor signals provided by said array.

2. The nuclear imaging apparatus of claim 1, wherein the array of radiation sensors is grouped into a first sub-array and a second sub-array diagonal relative to one another, such that the encoded signals combine sensor signals from each sub-array.

3. The nuclear imaging apparatus of claim 1, wherein said encoder is configured to:
  encode a first signal that represents either a top row or a bottom row of the array of radiation sensors;
  encode a second signal that represents either a left row or a right row of the array of radiation sensors; and
  encode a third signal that represents a total amount of energy received from the array of radiation sensors.

4. A nuclear imaging apparatus comprising:
  an array of radiation sensors, each sensor providing a sensor signal in response to a scintillation event incident on said array;
  a plurality of front-end encoders configured to receive, for each incident scintillation event, the sensor signals from the array of radiation sensors and to convert the sensor signals into a plurality of encoded signals for calculation of a spatial location of the scintillation event on said array, wherein said plurality of encoded signals is smaller in number than the sensor signals provided by said array; and
  a block encoder comprising:
    a plurality of inputs coupled to the outputs of said plurality of front-end encoders, and
    a plurality of outputs, wherein the block encoder is configured to encode the outputs of the plurality of front-end encoders.

5. The nuclear imaging apparatus of claim 4, wherein each of the outputs of the block encoder are either pseudo-differential pairs or fully differential pairs.

6. The nuclear imaging apparatus of claim 5 further comprising a plurality of differential operational amplifiers coupled to corresponding outputs of the block encoder.

7. The nuclear imaging apparatus of claim 4, wherein at least one of the outputs of the block encoder is a pseudo-differential pair comprising encoded information identifying a sub-array quadrant using the polarity of the at least one pseudo-differential pair.

8. The nuclear imaging apparatus of claim 4, wherein the block encoder encodes either sums or differences between the outputs of the plurality of front-end encoders.

9. The nuclear imaging apparatus of claim 4, comprising a plurality of block encoders that are each coupled to corresponding front-end encoders and array of radiation sensors.

10. The nuclear imaging apparatus of claim 4, further comprising a processor configured to:
  receive encoded signals from said block encoder, wherein the block encoder encodes signals from a plurality of sub-arrays of said array of radiation sensors, and the encoded signals comprise sub-array quadrant information, location information, and timing information; and
  decode the encoded signals to decode the sub-array quadrant information, the location information, and the timing information.

11. A method of reducing a number of signals from an array of radiation sensors comprising:
  detecting a scintillation event at the array of radiation sensors;
  encoding a first signal that represents either a top row or a bottom row of the array of radiation sensors;
  encoding a second signal that represents either a left row or a right row of the array of radiation sensors;
  encoding a third signal that represents a total amount of energy received from the array of radiation sensors.

12. The method of claim 11 further comprising encoding four sets of signals from four arrays of radiation sensors into three combined signals.

13. The method of claim 12, wherein each of the three combined signals are either pseudo-differential pairs or fully differential pairs.

14. The method of claim 13, wherein at least one of the three combined signals is a pseudo-differential pair comprising encoded information identifying a sub-array quadrant using the polarity of the at least one pseudo-differential pair of the three combined signals.

15. The method of claim 12, wherein encoding, in a block encoder, the four sets of signals comprises current summing or subtracting.

16. The method of claim 15, further comprising reconstructing an image of a subject using a plurality of sets of signals from a plurality of block encoders.

17. A method of encoding sub-array quadrant information, location information, and timing information from signals received from a nuclear imaging apparatus comprising:
  receiving, at a processor, encoded signals from a block encoder, wherein the block encoder encodes signals from a plurality of sub-arrays of radiation sensors, and the encoded signals comprise sub-array quadrant information, location information, and timing information;
  decoding, in the processor, the encoded signals to decode the sub-array quadrant information, the location information, and the timing information.

18. The method of claim 17, wherein the encoded signals from the block encoder are pseudo-differential or fully differential pairs.

19. The method of claim 18, wherein decoding the encoded signals comprises using the polarity of at least one pseudo-differential pair to decode the sub-array quadrant information.

20. The method of claim 17, wherein the location information is encoded in two of the encoded signals that are associated with radiation sensors that are diagonal relative to one another.

* * * * *